Sept. 7, 1937. G. A. PAGE, JR 2,092,655
AIRPLANE WITH SLEEPING ACCOMMODATIONS
Filed June 9, 1934 9 Sheets-Sheet 1

FIG. 1.

INVENTOR.
George A. Page Jr.
BY
ATTORNEY

Sept. 7, 1937.  G. A. PAGE, JR  2,092,655
AIRPLANE WITH SLEEPING ACCOMMODATIONS
Filed June 9, 1934   9 Sheets-Sheet 2

INVENTOR.
George A. Page Jr.
BY
ATTORNEY

Sept. 7, 1937. G. A. PAGE, JR 2,092,655
AIRPLANE WITH SLEEPING ACCOMMODATIONS
Filed June 9, 1934  9 Sheets-Sheet 3

INVENTOR.
George A. Page Jr.
BY
ATTORNEY.

Sept. 7, 1937.   G. A. PAGE, JR   2,092,655
AIRPLANE WITH SLEEPING ACCOMMODATIONS
Filed June 9, 1934   9 Sheets-Sheet 4

INVENTOR.
George A. Page Jr.
BY
ATTORNEY

Sept. 7, 1937.    G. A. PAGE, JR    2,092,655
AIRPLANE WITH SLEEPING ACCOMMODATIONS
Filed June 9, 1934    9 Sheets-Sheet 5

INVENTOR.
George A. Page Jr.
BY
ATTORNEY.

Sept. 7, 1937.  G. A. PAGE, JR  2,092,655
AIRPLANE WITH SLEEPING ACCOMMODATIONS
Filed June 9, 1934   9 Sheets-Sheet 6

INVENTOR.
George A. Page Jr.
BY
ATTORNEY.

Sept. 7, 1937.  G. A. PAGE, JR  2,092,655
AIRPLANE WITH SLEEPING ACCOMMODATIONS
Filed June 9, 1934  9 Sheets-Sheet 7

INVENTOR.
George A. Page Jr.
BY
ATTORNEY.

Sept. 7, 1937.　　　　　G. A. PAGE, JR　　　　　2,092,655
AIRPLANE WITH SLEEPING ACCOMMODATIONS
Filed June 9, 1934　　　　9 Sheets-Sheet 8

INVENTOR.
George A. Page Jr.
BY
ATTORNEY

Sept. 7, 1937.  G. A. PAGE, JR  2,092,655
AIRPLANE WITH SLEEPING ACCOMMODATIONS
Filed June 9, 1934   9 Sheets-Sheet 9

INVENTOR.
George A. Page Jr.
BY
ATTORNEY

Patented Sept. 7, 1937

2,092,655

UNITED STATES PATENT OFFICE 2,092,655

AIRPLANE WITH SLEEPING ACCOMMODATIONS

George A. Page, Jr., Ferguson, Mo., assignor, by mesne assignments, to Curtiss-Wright Corporation, a corporation of New York Application June 9, 1934, Serial No. 729,877

11 Claims. (Cl. 244—118)

This invention relates to aircraft, and more specifically, is concerned with the provision in aircraft of the cabin type, of sleeping accommodations which are readily convertible, during daytime, for use as normal seats of more or less conventional character.

It is obvious, of course, that the broad provision of convertible berths and seats is old, as, for instance, the conventional berths in railroad sleeping cars. However, when the principle of convertible sleeping accommodations is applied to aircraft, the details of the convertible arrangement must be completely reconsidered in view of the special problems involved. A primary consideration is that of weight, which makes necessary the design of the seating and sleeping accommodations in such a manner that the gross weight of the assemblage is kept at a minimum. Likewise, considerations of space are important, and it is obviously essential that proper ventilating means be provided which are suitable for use when the assemblage is organized as a sleeper or for normal seating of passengers. With these and many other considerations in mind, objects of this invention are to provide an aircraft cabin structure capable of being converted from and to an arrangement whereby passengers may be normally seated, and whereby sleeping accommodations are provided for substantially the same number of passengers as may be accommodated when seats are provided; to provide a novel arrangement of upper and lower berths in an aircraft which have a maximum of space in each for the accommodation of passengers; to provide a seating arrangement in an aircraft cabin permitting of the comfortable accommodation of a considerable number of passengers; to provide a combined sleeping and seating aircraft cabin organization wherein rapid conversion may be made between the two, and wherein a minimum amount of extra equipment is necessary to provide the sleeping accommodations; to provide a maximum degree of inter-utility of the parts and assemblies whereby they may be used for both seating accommodations and sleeping accommodations; to provide an aircraft cabin with a novel ventilating system; to provide individually controllable ventilating apparatus which may be utilized for individual ventilation of upper and lower berth compartments and which may be utilized when sleeping accommodations are not being used, for the ventilation of seating compartments; to provide, in an aircraft cabin having a compartment and a window therefor, upper and lower berth sleeping accommodations wherein the space for both the upper and lower berth may be lighted from said one window, while maintaining privacy for each sleeping compartment.

Still another object is to provide a novel means for withdrawing vitiated air from the cabin of an aircraft.

Other objects will become apparent from a reading of the annexed specification and from an examination of the drawings, in which.

For a better understanding of the drawings, which include a plurality of major assemblies and sub-assemblies, each such assembly comprising, in certain instances, a considerable number of individual elements, numerals will be used to designate major parts, assemblies and sub-assemblies, while the detailed structural elements of said parts, assemblies and sub-assemblies, will be designated by a numeral corresponding to the assembly, followed by a letter designating the individual element.

Figure 1:
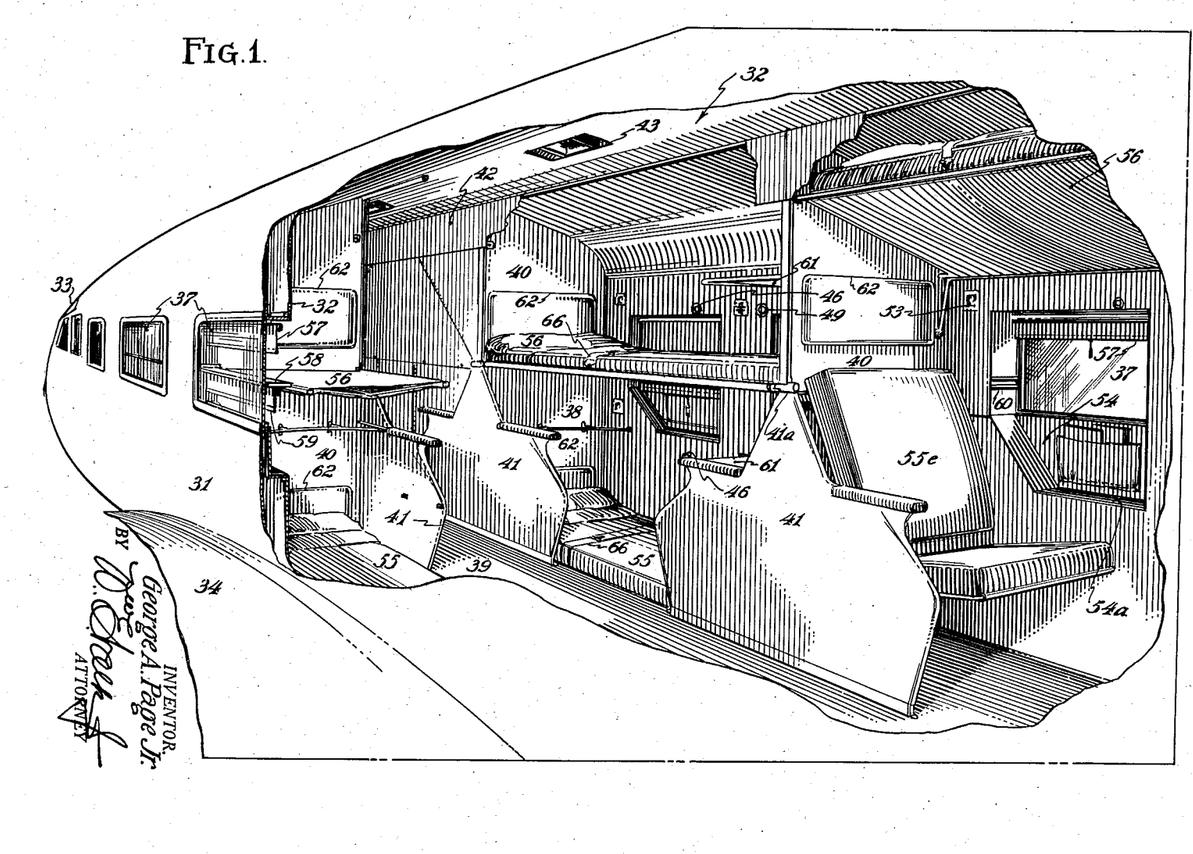
Fig. 1 is a perspective view, with parts broken away, of a fuselage showing the sleeping and seating arrangement of this invention.
Figure 2:
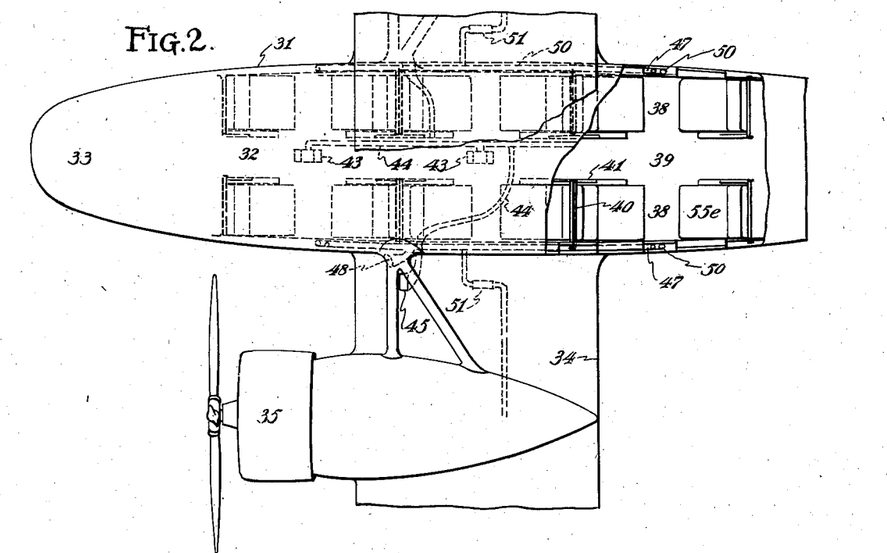
Fig. 2 is a plan view, with parts broken away, and showing ventilating manifolds.
Figure 3:
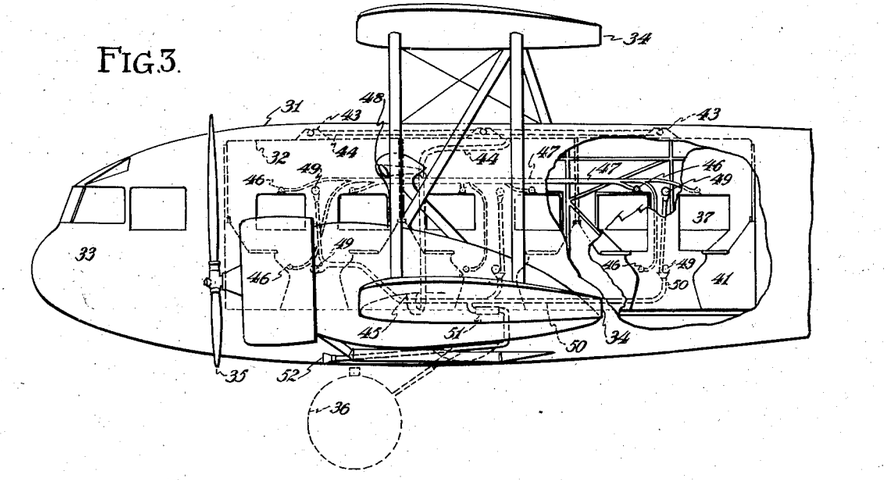
Fig. 3 is a side elevation, with parts broken away, and showing ventilating manifolds.

Referring to Figs. 1, 2, and 3, which show the general organization of this invention, 31 designates the aircraft fuselage containing a passenger cabin 32, and having at its forward end the usual control compartment 33 for the aircraft crew. The fuselage 31 is sustained in flight in the conventional manner by wings 34, is propelled by propellers 35, and is provided with a landing gear 36. The wall of the cabin 32 is provided with a plurality of windows 37, flush with the outer fuselage surface, and preferably fixed so that they may not be opened. Two such windows 37 are provided for each section 38 within the cabin. In the embodiment shown, three such sections are arranged in tandem on either side of the cabin 32, and a central aisle 39 allows for ingress and egress of the passengers. Each section is defined at its ends by a transverse partition 40 extending from the wall of the cabin inwardly to the aisle, and from the floor of the cabin to the ceiling thereof. Panels 41 rise from the floor to a point about midway of each partition 40, parallel to the aisle, to define the inner lower boundary of each section. These panels are spaced from each other to allow entry to each section, and include certain structural members which will hereinafter be more fully described. An apron 42 depends from the cabin ceiling to define the upper aisle boundary of each section, each apron running the full length of the cabin, and one such apron being provided on each side of the central aisle. When the cabin is organized for daytime seating of passengers, each section is open to the aisle, and illumination and ventilation are provided for the aisle by means of combined ventilating and lighting units 43 carried in the ceiling of the aisle. The ventilating elements of the units 43 are connected by a manifold 44 to an outlet opening 45, shown in Figs. 2 and 3, which opening is located in the upper surface of the wing 34 at a point approximately twenty-five percent of the chord rearward from the leading edge. As is well known in the art of aerodynamics, the air pressure on the wing at this point, in flight, is substantially less than atmospheric. Thereby, the pressure at this point on the wing is communicated to the opening 45, thus causing a suction throughout the manifold 44, whereby vitiated air is drawn from the cabin through the ventilators 43. These ventilators may therefore be called "educers", to distinguish them from additional ventilating means now to be described.

Individual cool air ventilators 46 are provided in each section, there being four such ventilators in each section, to distribute cool air when desired in adequate amounts, but with a minimum draft. Said ventilators 46 are connected into a common cool air manifold 47 terminating in an opening 48 subject to the airstream. Further ventilators 49 for conducting warm air to the cabin are provided in each section, these ventilators being connected to a common manifold 50 surrounded, in the engine nacelles, by an engine exhaust heated jacket 51. Air feeds to the exhaust heater and then to the warm air ventilators from a nozzle 52 located in the airstream.

A plurality of individual lights 53 for each section are fastened into the cabin wall. It will be noted in Fig. 1, particularly, that the inner wall of the cabin 32 and the outer wall of the fuselage are substantially spaced one from the other throughout the major surface of the fuselage in order to permit of sound and heat insulation. At and slightly below each window 37, however, the cabin wall is substantially thinner, whereby a recess 54 is provided below the window to form an arm rest 54a for each seated passenger.

The right side of Fig. 1 illustrates a section as made up for passenger seating, whereas the central section in Fig. 1 is made up for the accommodation of sleeping passengers. In the sleeping organization, a lower berth 55 lies directly upon the floor between the panels 41 and the cabin wall, and between the partitions 40, and an upper berth 56 is attached to the cabin wall and to the partitions in such a manner that it is at a level about half way up the height of the cabin. A passenger in either the upper or lower berth has substantially the same amount of head room, which head room is sufficient to enable the passenger to assume a sitting posture. Also, said upper berth substantially bisects the windows 37 in that section, whereby light may enter the upper berth space through the top half of the window, and may enter the lower berth space through the lower half of the window. A spring shade 57 is provided for the top half of the window, and a shelf 58 carrying a second spring shade 59 for the lower berth compartment, may be slipped into slides 60 in the window recess 54 to assure privacy to the occupant of either berth, the shelf only being removable upon removal of the upper berth 56. It will be noted that, when the section is arranged for sleeping, lights 53 are provided for both the upper and lower berth compartments, and hot air and cold air ventilators 49 and 46 are provided for each upper and lower berth compartment.

When the section is to be converted from the sleeping arrangement to the seating arrangement, certain elements of the lower berth 55 form the seats, while the upper berth 56 folds upwardly against the cabin ceiling to provide substantially full head room within the section. As will be more fully described later, the actual seat frames 61 used in the daytime arrangement form baggage racks, one such rack being organized for the lower berth compartment and the other for the upper berth compartment, each at the foot of each said compartment.

It will be appreciated that the berths may be made up so that the head of the passenger is always toward the front of the aircraft, no reversal of this organization being necessary. Therefore, pads 62 are permanently fixed to the head side of each partition 40, one said pad being near the floor to provide for a sleeping passenger in a lower berth, and the other being located at a level suitable for the sleeping passenger in an upper berth. By the arrangement of the seating and sleeping accommodations, the upper pad 62 also serves as a head rest for a daytime seated passenger.

Figure 12:
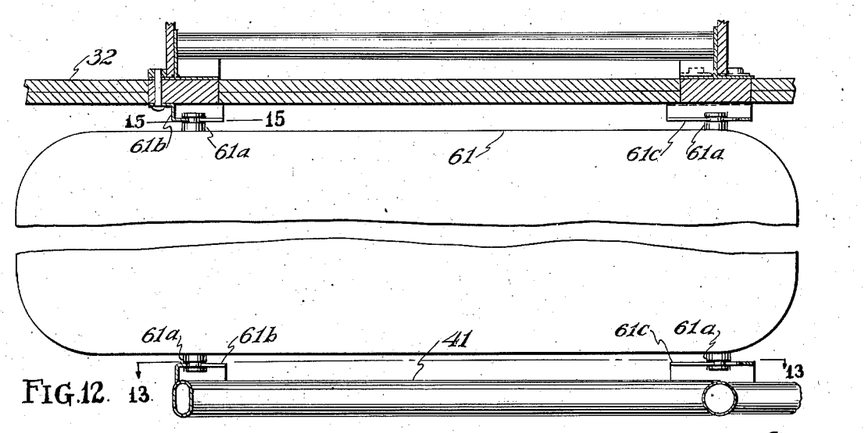
Fig. 12 is a section on the line 12—12 of Fig. 6, showing the method of attaching the seats.
Figures 13, 14, 14A, 15, 16:
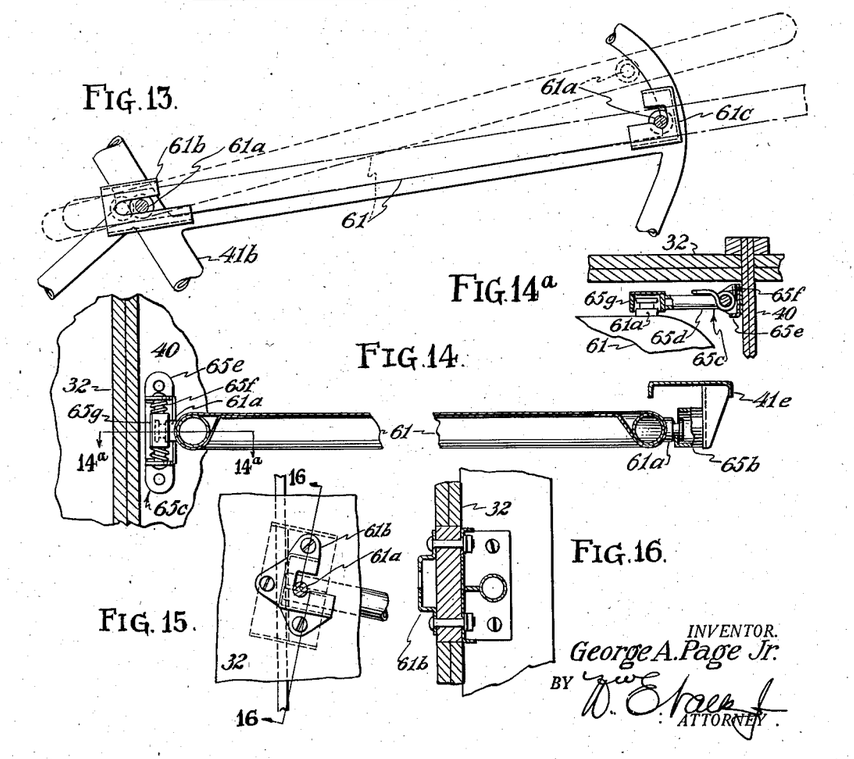
Fig. 13 is a section on the line 13—13 of Fig. 12.
Fig. 14 is a section in front elevation of the lower baggage rack supports.
Fig. 14a is a section on the line 14a—14a of Fig. 14 (in plan)
Fig. 15 is a section on the line 15—15 of Fig. 12.
Fig. 16 is a section on the line 16—16 of Fig. 15.
Figure 17:
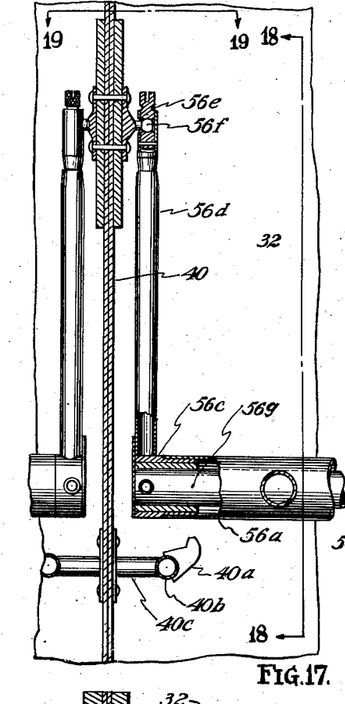
Fig. 17 is a section on the line 17—17 of Fig. 5, showing part of the upper berth supporting structure.
Figure 18:
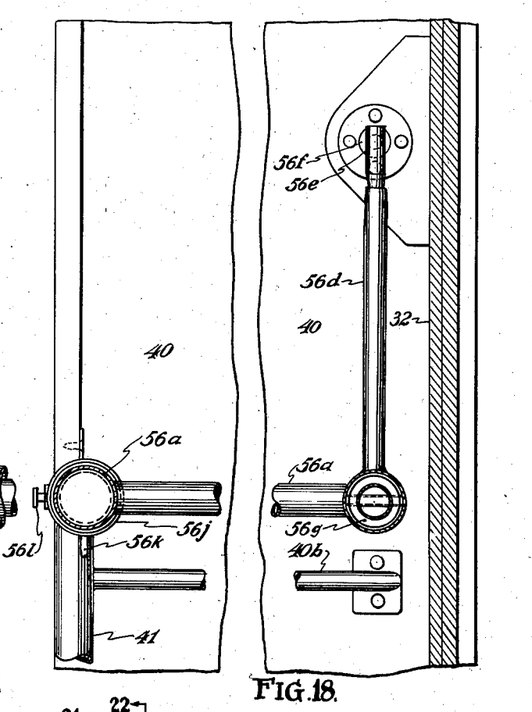
Fig. 18 is a section on the line 18—18 of Fig. 17, and is a transverse section, broken away, through both edges of the upper berth.
Figures 19, 20, 21, 22, 23:
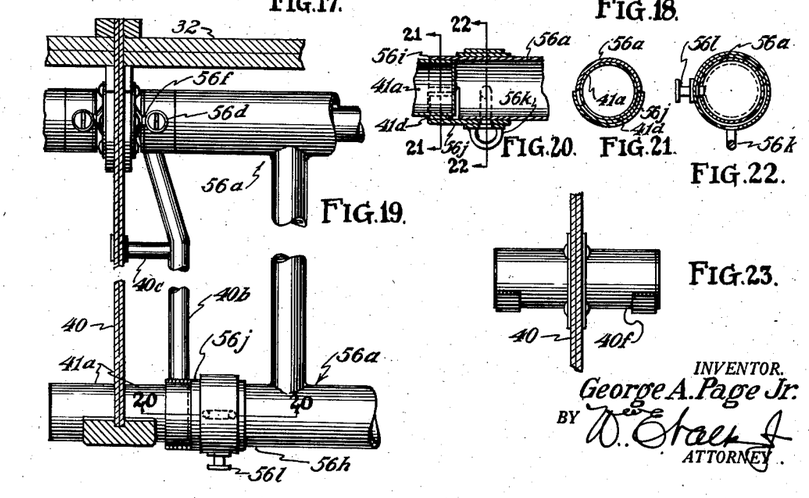
Fig. 19 is a section on the line 19—19 of Fig. 17, and is a plan, broken away, through the section partition.
Fig. 20 is a section on the line 20—20 of Fig. 19.
Figs. 21 and 22 are sections, respectively, on the lines 21—21 and 22—22 of Fig. 20.
Fig. 23 is a section on the line 23—23 of Fig. 5, showing the supporting stud for the retracted upper berth.
Figure 24:
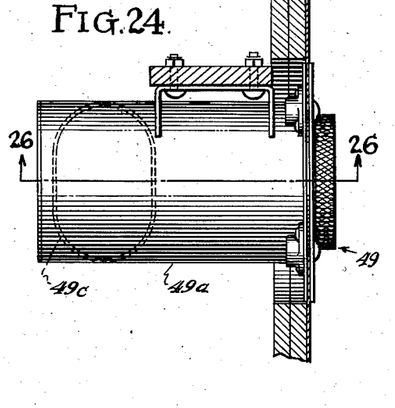
Fig. 24 is a section on the line 24—24 of Fig. 4, showing a fresh air ventilator.
Figure 25:
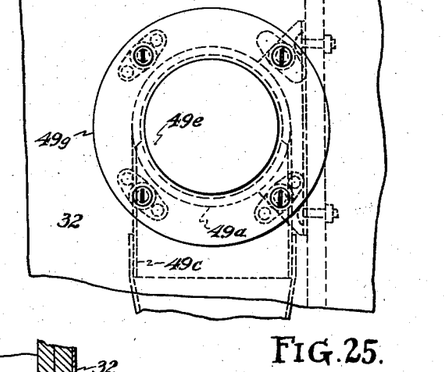
Fig. 25 is an enlarged detail view of the ventilator of Fig. 24.
Figure 26:
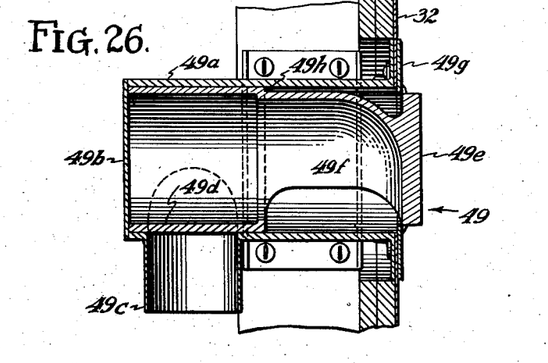
Fig. 26 is a section on the line 26—26 of Fig. 24.
Figure 27:
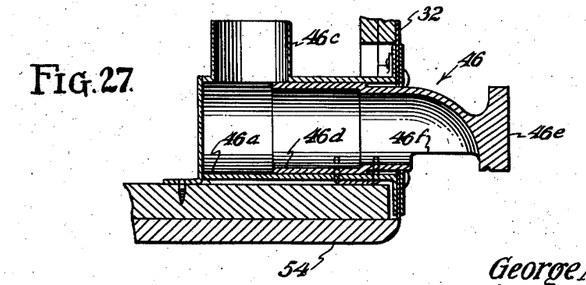
Fig. 27 is a section on the line 27—27 of Fig. 4, showing an air ventilator.

Now reference may be made to Figs. 4, 5, 6, 7, 12, 13, 14, 15, and 30, which show the detailed construction of the lower berth 55 and the means by which it is converted for use as a daytime seating arrangement. The mattress for the lower berth is formed by two pairs of cushions 55a which, when laid end to end on the floor, fully occupy the space from one partition 40 to the next. Each cushion pair includes a seat cushion 55b and a back cushion 55c joined together by a fabric strip 55d. When used as daytime seats, each cushion 55b rests upon the seat frame 61 comprising a substantially rectangular tubular frame covered by fabric. Said seat frame 61, as mentioned heretofore, is removable, so that it may be re-installed in suitable brackets to provide baggage racks for the upper and lower berths. The seat frame 61 is provided at its four corners with slotted studs 61a, as best shown in Figs. 12 and 13, the rearmost studs being engageable in slotted fittings 61b, carried respectively by the panel 41 and the wall of the cabin 31. The forward studs 61a are engageable in bayonet slotted fittings 61c also carried by the panel 41 in the wall of the cabin 31, so that the seat frame 61 is held in a slightly tilted position suitable for comfortable seating. As shown in Fig. 13, the seat frame 61 is readily removable by lifting the forward edge thereof, sliding it rearwardly, then sliding it upwardly and forwardly.

Figure 8:
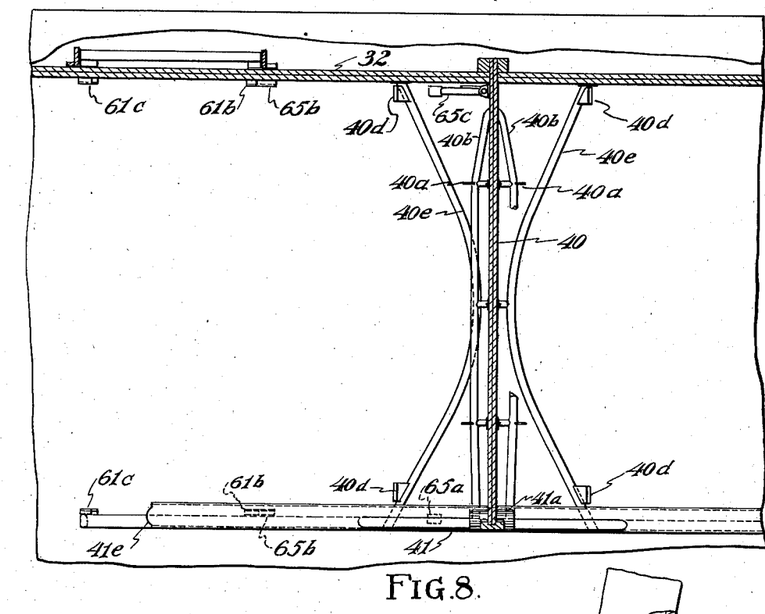
Fig. 8 is a sectional plan of the section partitions and seat supports.
Figures 9, 10, 11:
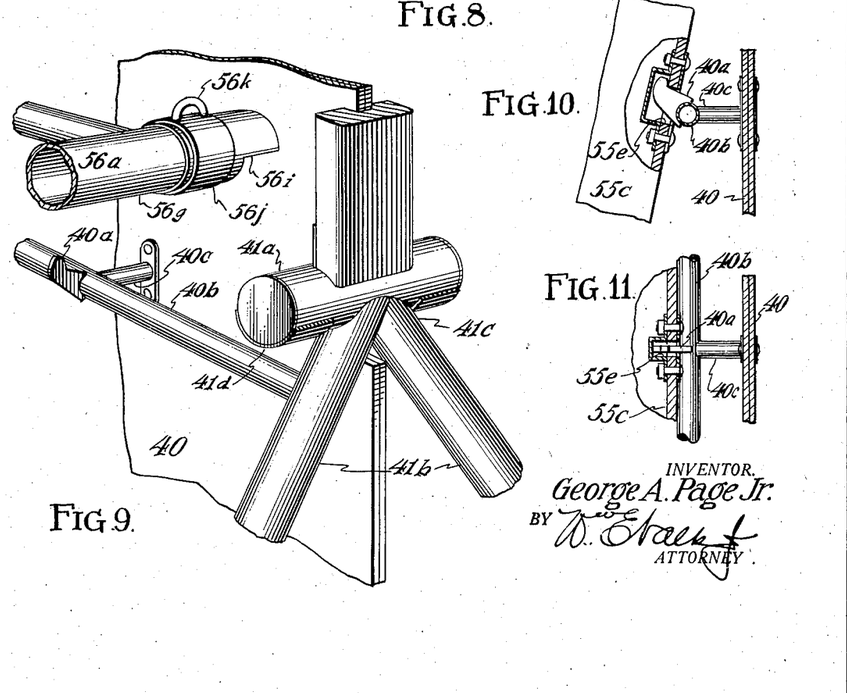
Fig. 9 is a perspective of the mechanism for supporting part of the upper berth.
Fig. 10 is a section on the line 10—10 of Fig. 5.
Fig. 11 is a plan view of the details shown in Fig. 10.

The cushion unit 55a, after assembly of the seat frame, may be arranged so that the seat cushion 55b rests upon and may be clipped to the seat frame. Each back cushion 55c is provided with several openings 55e toward its upper edge, so that the cushion 55c may be slipped over hooks 40a fixed to the partition 40. Fig. 9 also shows the organization of the hooks 40a which are carried by a transverse tube 40b on brackets 40c. The lower rearward portion of the back cushion 55c rests at its edges against abutments 40d, shown in Fig. 8, which are attached to truss members 40e bracing the partition 40, the panel 41 and the cabin wall. When the seat is arranged, the fabric strip 55d joining the cushions 55b and 55c, serves to prevent loss of articles between the seat cushion and the back cushion. Rearrangement of the seat cushions to form the mattress for the lower berth is readily accomplished by unhooking the cushions from their supports and in laying them on the cabin floor. It may be here noted, referring to Fig. 4, that the lower ventilators 46 and the lower light 53, these being flush with the cabin wall, are covered by the assembly of the seat for daytime use, so that inadvertent damage to these devices is unlikely.

The upper berth organization will now be described in detail, and particular reference may be made to Figs. 4, 5, 9, 17, 18, 19, 20, 21, 22, and 23. The berth 56 comprises a frame 56a of rectangular form and preferably made from tubing, this frame being covered by strong fabric, and having a curved metal covering 56b attached therebelow to improve the appearance of the berth when nested, and to form a definite partition between the upper and lower berth compartments when the berth is arranged for sleeping. The inner corners of the frame 56a are journaled on bushings 56c carried by tension arms 56d, these arms being connected at their one ends 56e to ball-shaped studs 56f rigidly affixed to the partition 40, and being attached at their other ends to the bushings 56c with respect to which, as previously indicated, the frame 56a may swing. The bushings 56c are joined by a bracing tube 56g passing through the inner tubular member of the frame 56a, whereby the arms 56d at each end of the frame are held in fixedly spaced relation.

Figure 5:
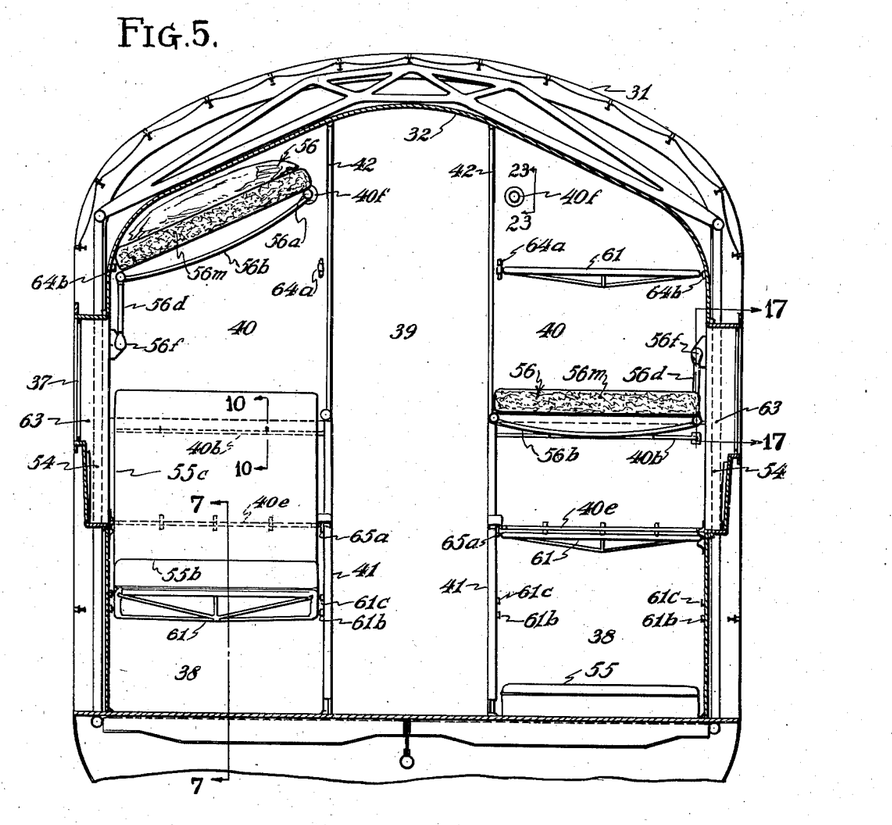
Fig. 5 is a section on the line 5—5 of Fig. 4, also showing the upper and lower berths in end view.

The outer corners 56h of the frame 56a are formed with semi-circular sockets 56i, each of which is adapted to engage with a stud 41a formed at the upper apex of the panel 41. Said panel comprises a tubing structure 41b starting from the floor in spaced relation to the partition 40, converging to an apex 41c at a height approximately midway of the cabin height, and intersecting the partition 40. The studs 41a project on each side of the partition 40 from the apex 41c, so that one stud extends slightly into one section on one side of the panel, and the other stud extends into the other section on the opposite side of the panel. Each said stud is provided with a semi-circular strip 41d on each lower face, whereby the socket 56i, when it engages the stud, cooperates with the strip 41d to form a cylindrical assembly over which a locking sleeve 56j may be rotated to lock the outer end of the berth to the stud. Such a sleeve 56j is rotatable on each outer corner of the frame 56a by means of a handle 56k, the sleeve 56j being slotted to receive a locking pin 56—l by which the sleeve 56j may be moved to either a locking or an unlocking position around the stud 41a. Studs 40f, shown in detail in Fig. 23, and shown for location in Fig. 5, are similar in conformation to the studs 41a, but are located on the partition 40 just under the apron 42. The locking fittings at the corner 56h of the frame 56a may be engaged with either the studs 41a or the studs 40f.

The above organization allows the frame 56a of the upper berth to be swung from the folded position, as shown on the left side of Fig. 5, to an active position, as shown on the right side of Fig. 5. To accomplish the change in position of the upper berth, assuming it to be folded, the sockets 56i of the frame 56a are disconnected from the studs 40f, the outer edge of the berth is raised slightly, and the inner edge of the berth is swung downwardly and outwardly upon the arms 56d, these arms then swinging from an upwardly extending vertical position to a downwardly extending vertical position, whereupon, the outer edge of the berth is swung downwardly so that the sockets 56i may be engaged with the studs 41a. Mattress and bedding 56m for the upper berth are retained on the berth frame 56a when the berth is either active or inactive. By the upper berth organization, as particularly shown in Fig. 5, it will be apparent that the berth is elevated close to the cabin ceiling when folded, thus allowing substantially full head room above the heads of passengers seated in the seats now designated as 55e, which are assembled as previously described by means of the elements of the lower berth and the seat frames 61. When the upper berth is moved downwardly to its active position, the berth level is substantially halfway up the height of the cabin, and likewise, the berth horizontally bisects the windows 37. In the preferred embodiment, the height of the berth when organized for sleeping is about forty-two inches from the floor, which enables an able-bodied passenger to readily get into the berth without undue exertion. Access to the berth by cumbersome persons may readily be gained by use of a single portable step (not shown). The height of the berth as organized herein, is a considerable improvement over prior practice, wherein the upper berth is at a considerably greater height from the floor and is much more difficult of access. As previously indicated, the lower berth 55 is at the floor level, so that substantially the same amount of head room obtains for occupants of both a lower and an upper berth, this head room being sufficient to allow a person of average stature to sit upright in either berth.

The window recess 54, when the upper berth is in a position for sleeping, makes a passageway 63, shown in Fig. 5, between the inner edge of the berth and the window. Obviously, for the sake of privacy, such a passage is undesirable, so that provision to fill this passage is effected by the shelf 58, which is insertable within the slides 60 prior to lowering of the upper berth. During daytime operation, when the shelf 58 is removed, the upper window shade 57, which is attached to the cabin adjacent the top of the window 37, may be drawn down to shield the whole window. When the upper berth is in active position, the shade 57 serves for the upper berth, and the shade 59, attached to the shelf 58, serves for the lower berth. This shelf and shade arrangement is shown in Fig. 1.

As previously indicated, the seat frames 61 are used during daytime operation for the passenger seats 55e, but are removed when the berths are made active to serve as baggage racks at the foot of each upper and lower berth. A fitting 64a is attached to the partition 40 about midway between the stud 41a and the apron 42 to hold an outer corner of the seat frame 61 used as a baggage shelf for the upper berth. Fittings 64b and 64c are attached to the wall of the cabin 32 on the same level with the fitting 64a, to hold the inner studs 61a of the frame 61. The several fittings 64a, 64b and 64c are of somewhat similar style to the fittings 61b and 61c, to receive the studs 61a of the seat frames.

Figure 6:
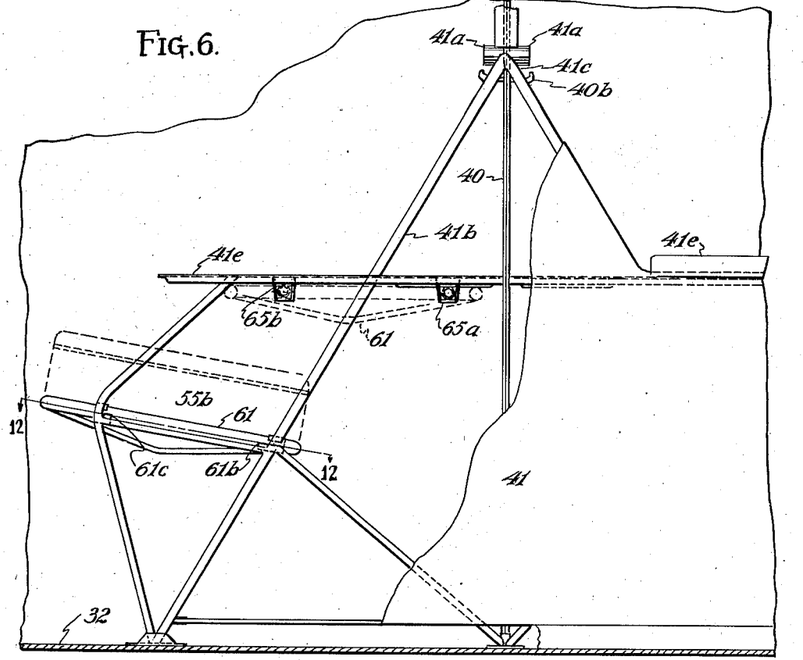
Fig. 6 is a fragmentary side elevation of a seat and its convertibility to a baggage rack.
Figure 7:
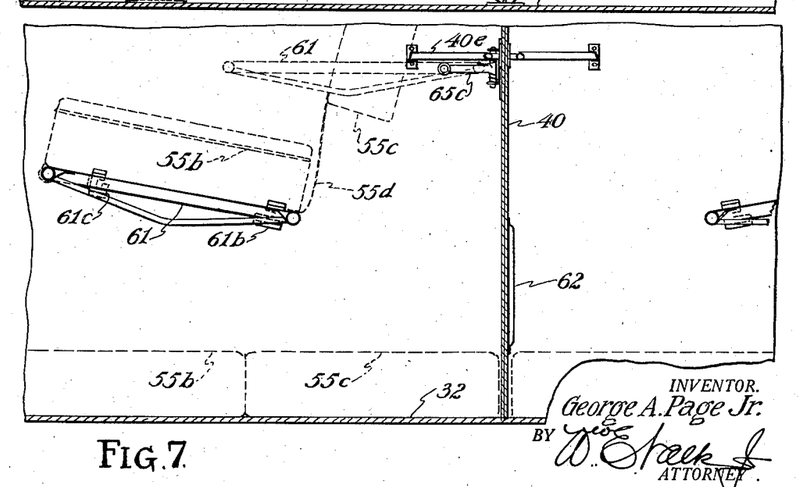
Fig. 7 is a section on the line 7—7 of Fig. 5.

When one of the seat frames 61 is used as a baggage shelf for the lower sleeping compartment, it is attached to the inner face of the panel 41 by fittings 65a and 65b, shown in Figs. 6 and 14, these fittings receiving the frame studs 61a. The inner edge of the seat frame is held by a fitting 65c, which engages an inner stud 61a of the seat frame. This fitting 65c is of special construction to permit of the seat frame 61 being installed, and comprises an arm 65d pivoted on a vertical axis to a bracket 65e, whereby the arm is capable of lateral swinging. A spring 65f tends to urge the arm 65d against the wall of the cabin 32, and the free end of the arm is provided with a bayonet socket 65g within which the stud 61a may engage. Installation or removal of the frame 61 as a baggage shelf for the lower sleeping compartment is readily accomplished by first inserting the outer seat frame studs 61a in the outer fittings 65a and 65b, after which the inner stud 61a is inserted in the fitting 65c. The fittings 65a and 65b, mounted on the panel 41, are placed immediately below an arm rest 41e formed in conjunction with the panel 41 and the panel bracing 41b.

Figure 4:
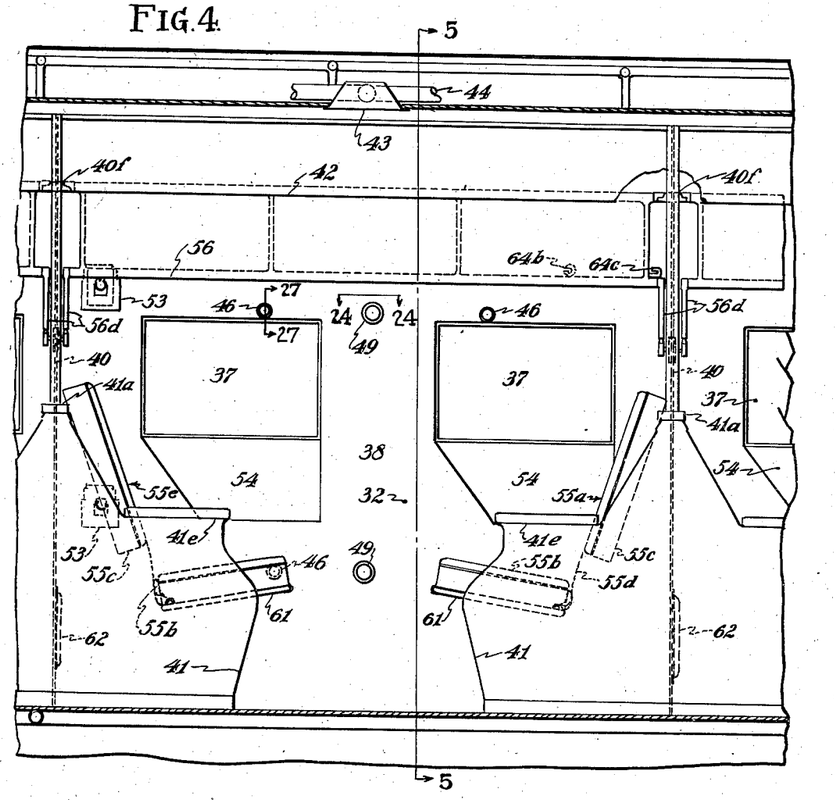
Fig. 4 is a fragmentary side section through the cabin, showing the seating arrangement.
Figure 28:
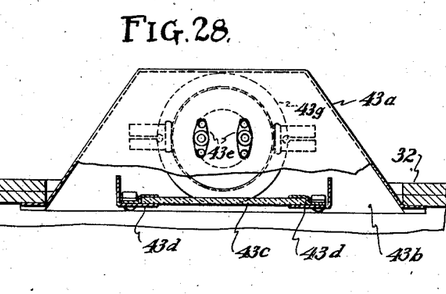
Fig. 28 is a side section through a cabin air educer and aisle light.
Figure 29:
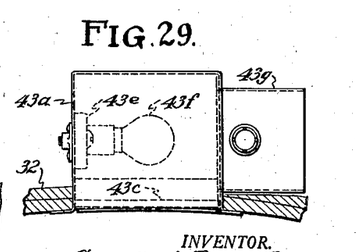
Fig. 29 is an end view of the cabin air educer.
Figure 30:
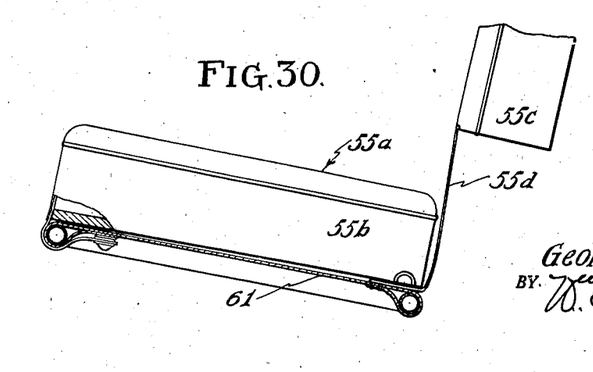
Fig. 30 is a side elevation of parts of the seat cushions.

Referring now to the combination aisle light and air educer 43, the location of units of this character is shown in Figs. 1 and 4 and the details of construction thereof are shown in Figs. 28 and 29. The unit 43 comprises a metal box 43a having an open bottom 43b, said bottom being provided across the middle thereof with a translucent lens 43c, the latter being carried by angle brackets 43d attached at their ends to the box. Within the box and above the lens 43c, a lamp socket 43e is attached to receive a lamp 43f. An air connection 43g is let into one side of the box above the lens to connect with the manifold 44. Illumination for the aisle emanates from the lamp 43f, the light passing through the lens and also being reflected indirectly around the lens by virtue of the slanted ends of the box. The open portions of the box at the ends of the lens permit vitiated air to pass within the box, to be withdrawn through the manifold 44. Preferably one such lighting and air educing unit 43 is installed centrally of the aisle opposite each section. Thereby, in the present embodiment, three such units are used.

The ventilating units 46 and 49, best shown for location in Fig. 4, are shown in detail in Figs. 24 to 27. Each unit 49 comprises a cylindrical member 49a set into the cabin wall and having its open end flush with said cabin wall. The inner end of the cylinder 49a is closed as at 49b, and is provided with an air inlet connection 49c. A ventilating fitting 49d comprises a tube slidable within the cylinder 49a, said tube having a knurled outer terminal 49e whereby the fitting 49d may be drawn from or pushed toward the cabin wall. The inner end of the fitting is open, as also is the outer side thereof as at 49f, so that, when the fitting is drawn out, air may pass from the connection 49c into the cylinder and out through the opening 49f into the passenger compartment. The fitting 49d may be rotated by means of the knurled terminal 49e so that air may be directed in any direction desired. A flange plate 49g is arranged over the open end of the cylinder 49a, which may be engaged by a shoulder 49h formed on the fitting 49d, so that the fitting may not be wholly withdrawn. The construction of the ventilator 46 is identical in principle with that outlined above. The construction thereof may be followed by reading the above description of the ventilator 49 in conjunction with the figures indicated for the element 46.

From the above description it is believed that an appreciation may be gained of all of the various assemblies which coordinate to allow of the construction of a practicable convertible sleeping arrangement for an aircraft. The relationship of the various elements is essential to the ultimate objective, and the position of all of the various major units such as windows, berths, ventilators, lights, seats and the like, are arranged for functional coordination. In actual embodiments of this invention which have been built, the whole assemblage has resulted in a very light and convenient construction. It has been found that the total time necessary for a reasonably experienced operator to convert each passenger section between a daytime seating arrangement and a night-time sleeping arrangement, or vice versa, is on the order of about three minutes, whereby the whole craft, having six sections, may be converted in a period of about half an hour. A high degree of comfort for passengers is provided by virtue of the convenient location of lights and ventilators and by their efficiency in operation, and it has been found that a minimum amount of redesign of a more or less standard daytime passenger fuselage is necessary to provide the convertible sleeping accommodations.

A maximum of privacy is assured for occupants of both upper and lower berths by the provision of curtains of conventional character for each such berth. Such curtains are shown generally in Fig. 1.

It may be noted, in referring to Fig. 1, that safety belts are provided for each berth, these belts being designated as 66, and being attached to suitable eyes in the floor for the lower berth and to the side rails of the upper berth. The belts are adjustable and the passenger may tighten the belt to a reasonable degree as a measure of safety against inadvertent rough landings or the like. It is contemplated that each berth may be provided with a mirror on the cabin wall, and with a hammock for clothing, etc., similar to those used in sleeping cars.

In the operation of a craft of this character, which conventionally includes lavatory facilities at the rearward end of the cabin, it is proposed that terminal facilities be provided with comfortable dressing rooms in which passengers may make their toilet preparatory to boarding the airplane, which previously has been made up as a sleeper. Passengers may then board the sleeper, disrobe either in the airplane lavatory or in their berths, and enter the latter. It is entirely feasible that passengers will enjoy a comfortable rest during a night flight, since with the modern improvements in transport craft, the noise in the airplane cabin is not at all objectionable and the cabin is probably freer from vibration and noise than the average sleeping car. Upon arrival at the destination, passengers may clothe themselves either in their berths or in the airplane lavatory, and then may debark to finish their toilet in the terminal dressing room. If the flight is to be continued during the daytime, the aircraft crew may convert the berths for daytime seating while passengers are in the terminal, whereupon, they may reenter the plane and enjoy daytime flying in comfortable seats.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. The combination, in an aircraft cabin, of fixed partitions defining a section for the accommodation of passengers, a bodily removable seat frame, means at one level for attaching said seat frame to said partitions to serve as a seat cushion support, means at a higher level for attaching said frame to said partitions to serve as a baggage rack, and a seat cushion organized to be placed upon said seat frame when the latter is positioned as a seat support and organized to be placed at a lower level and as a portion of a berth mattress when said frame is placed as a baggage rack.

2. The combination, in an aircraft cabin, of fixed side and end wall partitions defining a section for the accommodation of passengers, a pair of bodily removable cushions organized either for use as a berth mattress wherein said cushions lie adjacent to the floor of said section or for use in an elevated position as a seat and a back cushion, and a bodily removable frame carried by said side wall partitions and shiftable from one elevated position to another, said frame in one position of adjustment providing a support for said seat cushion, and, in a different position of adjustment providing for said section a baggage rack.

3. In an upper berth organization for an aircraft cabin, said cabin having end and side wall partitions, a non-collapsible substantially rectangular berth frame, arms pivoted to said partitions and to the inner corners of said berth frame to permit said frame to be swung throughout a radius equal to the length of said arms from a point above to a point below the points of pivoting of said arms on said partitions, separable means of connection between the outer corners of said berth frame and said partitions organized for connection when the berth frame is swung below said partition pivots, so organized that said berth is held substantially horizontal at a relatively low level, and a second elevated separable means of connection between said berth frame and said partitions organized for connection when the berth frame is swung above said partition pivots to hold said berth frame in an elevated slanted position.

4. A demountable berth frame organization for an aircraft cabin, including an upper berth adapted to lie, when made up for sleeping, in a substantially horizontal attitude substantially at half the height of said cabin, and adapted, when folded, to lie in a nested position close to the cabin ceiling, said berth frame having a bodily shiftable hinge axis at its inner edge comprising struts pivoted at their ends to the berth and cabin wall respectively and swingable to place the inner edge of said frame, when nested, close to the ceiling, and swingable to place said inner edge, when said frame is extended, substantially at half the height of the cabin wall, the radius of swing, in changing from nested to extended position, being equal to the distance between the strut pivots.

5. In an aircraft cabin passenger section having demountable opposed seats for daytime passenger accommodation and having a demountable upper and a demountable lower berth for night passenger accommodations, a pair of bodily removable substantially similar frames for said seats, each said frame, in one position of adjustment, being adapted to support one said seat during the daytime arrangement, and said frames, in different positions of adjustment, and during the night arrangement, being adapted to form baggage racks for said upper berth and for said lower berth respectively.

6. In an aircraft cabin passenger section having end partitions, said section having passenger seats convertible to a lower berth, and having a foldable upper berth, a pad fixed to said partition to serve as a head rest for a seated passenger when said upper berth is folded, and as a head rest for a recumbent passenger when said upper berth is occupied and extended.

7. In an aircraft cabin passenger section, partitions extending outwardly from the cabin wall to define the ends of said section, a panel structure rising from the cabin floor and defining the inner side of said section, an upper berth hinged adjacent to the cabin wall and swingable between a nested position and a substantially horizontal position, and means for fastening the outer edge of said berth to said panel structure whereby said berth is supported at its outer edge by said panel structure and at its inner edge by said cabin wall.

8. In an aircraft cabin passenger section, partitions extending outwardly from the cabin wall to define the ends of said section, a panel structure rising from the cabin floor and defining the inner side of said section, an upper berth hinged adjacent to the cabin wall and swingable between a nested position and a substantially horizontal position, means for fastening the outer edge of said berth to said panel structure whereby said berth is supported at its outer edge by said panel structure and at its inner edge by said cabin wall, and means carried by said partitions for supporting the outer edge of said berth in its nested position.

9. In an aircraft, a plurality of tandem berth sections, partitions between and defining the ends of said sections, panel structures extending substantially parallel to the cabin wall and extending from an apex substantially midway the height of the inner edge of said partition downwardly on each side of each partition to the cabin floor, a foldable upper berth in each section hinged at its inner edge to the cabin wall, and means for engaging each end of the outer edge of each said berth with an apex of one said panel, whereby the adjacent outer ends of successive berths are supported by one said panel.

10. In a cabin having convertible sleeping accommodations, a window intermediate the height of a cabin side, struts hinged to said side and swingable in a substantially vertical plane and of such length that when swung downward, the outer strut ends lie on a line intermediate the window height and when swung upward, lie above the window, and an upper berth frame movable from an extended to a folded position pivotally mounted at the ends of said struts and swingable therewith to position said frame in its folded position, well above said window.

11. In a cabin having convertible sleeping accommodations, a window intermediate the height of a cabin side, struts hinged to said side and swingable in a substantially vertical plane and of such length that when swung downward, the outer strut ends lie on a line intermediate the window height and when swung upward, lie above the window, an upper berth frame pivotally mounted at the ends of said struts, an upper berth frame movable from a folded to an extended position, pivotally mounted at its inner edge at the ends of said struts and swingable therewith to position said frame, in its folded position, clear of said window, and fixed means for supporting the outer edge of said berth in either folded or extended position, said means being disposed respectively well above and intermediate the top and bottom edges of said window.

GEORGE A. PAGE, Jr.